US010950889B2

(12) United States Patent
Christensen et al.

(10) Patent No.: US 10,950,889 B2
(45) Date of Patent: Mar. 16, 2021

(54) ELECTROLYTE

(71) Applicant: Robert Bosch GmbH, Stuttgart (DE)

(72) Inventors: John Christensen, Elk Grove, CA (US); Sondra Hellstrom, Menlo Park, CA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 16/313,232

(22) PCT Filed: Jun. 30, 2017

(86) PCT No.: PCT/EP2017/066316
§ 371 (c)(1),
(2) Date: Dec. 26, 2018

(87) PCT Pub. No.: WO2018/002324
PCT Pub. Date: Jan. 4, 2018

(65) Prior Publication Data
US 2020/0280091 A1  Sep. 3, 2020

Related U.S. Application Data

(60) Provisional application No. 62/356,902, filed on Jun. 30, 2016.

(51) Int. Cl.
*H01M 10/052* (2010.01)
*H01M 10/0562* (2010.01)
(Continued)

(52) U.S. Cl.
CPC ......... *H01M 10/0562* (2013.01); *H01M 4/02* (2013.01); *H01M 4/13* (2013.01); *H01M 4/62* (2013.01); *H01M 4/624* (2013.01); *H01M 10/0525* (2013.01); *H01M 10/0565* (2013.01); *H01M 2004/028* (2013.01);
(Continued)

(58) Field of Classification Search
CPC ........ H01M 10/056; H01M 4/13; H01M 4/62; H01M 10/0525; H01M 2004/028; H01M 2300/0068; H01M 2300/0082; H01M 2300/0091; H01M 2300/0094
See application file for complete search history.

(56) References Cited

U.S. PATENT DOCUMENTS

2017/0187063 A1*  6/2017  Pistorino .............. H01M 10/052
2017/0222262 A1*  8/2017  Kim ....................... H01M 2/166

FOREIGN PATENT DOCUMENTS

EP      2136431 A1   12/2009
KR  20160033894 A    3/2016
(Continued)

OTHER PUBLICATIONS

Yada et al., "Dielectric Modifcation of 5V-Class Cathodes for High Voltage All-Solid-State Lithium Batteries", Advanced Energy Materials, vol. 4, 2014 (5 pages).
(Continued)

*Primary Examiner* — Victoria H Lynch
(74) *Attorney, Agent, or Firm* — Michael Best & Friedrich LLP

(57) ABSTRACT

The use of mucic acid gallate compounds in a non-sugar sweetener such as a steviol glycoside-containing consumable to provide lingering aftertaste specific masking effect is provided.

10 Claims, 2 Drawing Sheets

(51) Int. Cl.
  *H01M 4/02*      (2006.01)
  *H01M 4/13*      (2010.01)
  *H01M 4/62*      (2006.01)
  *H01M 10/0525*   (2010.01)
  *H01M 10/0565*   (2010.01)

(52) U.S. Cl.
  CPC ............... *H01M 2300/0068* (2013.01); *H01M 2300/0071* (2013.01); *H01M 2300/0082* (2013.01); *H01M 2300/0091* (2013.01); *H01M 2300/0094* (2013.01)

(56) References Cited

FOREIGN PATENT DOCUMENTS

WO    2006068428 A1    6/2006
WO    2011124347 A1    10/2011

OTHER PUBLICATIONS

Azadmanjiri et al., "A review on hybrid nanolaminate materials synthesized by deposition techniques for energy storage applications", Journal of Materials Chemistry A, 2014 (14 pages).
European Patent Office Examination Report for Application No. 17734326.6 dated Dec. 16, 2019 (5 pages).
International Search Report and Written Opinion for Application No. PCT/EP2017/066316 dated Sep. 21, 2017 (9 pages).

* cited by examiner

ELECTROLYTE

FIELD

The invention generally relates to electrolytes for secondary batteries, and more particularly to solid electrolytes for lithium batteries.

BACKGROUND

Rechargeable lithium batteries are attractive energy storage devices for portable electric and electronic devices and electric and hybrid-electric vehicles because of their high specific energy compared to other electrochemical energy storage devices. A typical lithium cell contains a negative electrode, a positive electrode, and a separator located between the negative and positive electrodes. Both electrodes contain active materials that react with lithium reversibly. In some cases, the negative electrode may include lithium metal, which can be electrochemically dissolved and deposited reversibly. The separator contains an electrolyte with a lithium cation, and serves as a physical barrier between the electrodes such that none of the electrodes are electrically connected within the cell.

Typically, during charging, there is generation of electrons at the positive electrode and consumption of an equal amount of electrons at the negative electrode. During discharging, opposite reactions occur.

Current Li-ion cells are reaching their theoretical maximum energy storage capability and are still unable to provide an economical battery with energy storage sufficient to enable electric vehicle ranges of greater than about 100 miles. A next generation all solid-state lithium ion battery is an area of active research. One factor inhibiting the commercialization of next generation solid-state batteries is the lack of a suitable solid electrolyte. Existing solid electrolytes exhibit one or more deficiencies, including insufficient conductivity (e.g., polymers), poor processability and high boundary resistances (e.g., ceramics), and/or chemical instability to air and water (e.g., sulfidic materials). What is therefore needed is a solid electrolyte which enables this next generation of batteries.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to electrolyte compositions and their use in secondary batteries.

In one embodiment, the disclosure provides an electrolyte comprising: an ionically conductive polymer; an ionically conductive ceramic; and a dielectric material having a dielectric constant of at least about 50.

In another embodiment, the disclosure provides a cathode comprising: an active cathode material; a conductive material; and an electrolyte comprising: an ionically conductive polymer; an ionically conductive ceramic; and a dielectric material having a dielectric constant of at least about 50.

In another embodiment, the disclosure provides a battery comprising: an anode; a separator; and a cathode comprising an active cathode material; a conductive material; and an electrolyte comprising: an ionically conductive polymer; an ionically conductive ceramic; and a dielectric material having a dielectric constant of at least about 50.

The details of one or more features, aspects, implementations, and advantages of this disclosure are set forth in the accompanying drawings, the detailed description, and the claims below.

DETAILED DESCRIPTION

Figure 1:
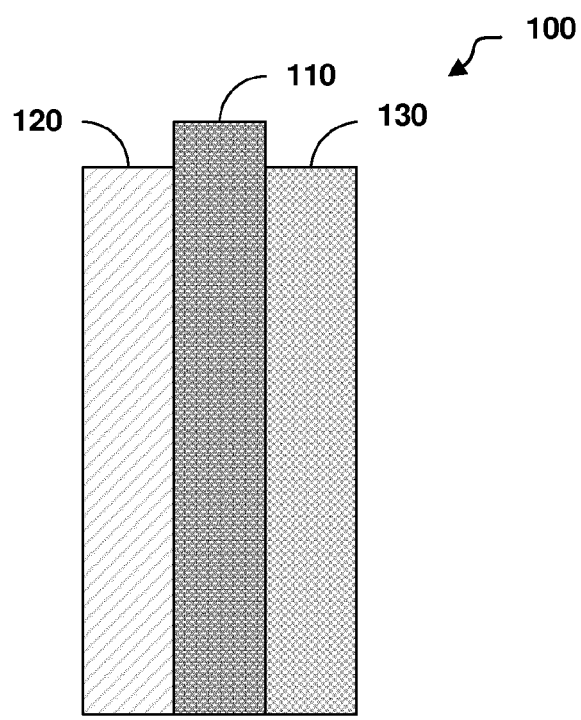
FIG. 1 is a schematic diagram illustrating a cathode electrode, in accordance with some embodiments.

One or more specific embodiments will be described below. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In one aspect, the invention provides an electrolyte. In an embodiment, the electrolyte includes an ionically conductive polymer, and/or an ionically conductive ceramic, and a dielectric material. In various embodiments, the ionically conductive polymer comprises a repeat unit (e.g., ethylene oxide derivatives, propylene oxide derivatives, ethylene imine derivatives, silane derivatives, siloxane derivatives, vinylidene fluoride derivatives, aniline derivatives, acrylonitrile derivatives, thiophene derivatives) which allows the conduction of metal ions between the cathode and anode. In various embodiments, the ionically conductive ceramic comprises a lithium containing ceramic (e.g., lithium aluminum titanium silicon phosphate (LATSP), lithium lanthanum zirconate (LLZO), lithium lanthanum titanate (LLTO)). In various examples the dielectric material may comprise a dielectric particle.

Suitable dielectric materials include, but are not limited to, zirconium silicon oxides ($ZrSiO_x$), barium titanate ($BaTiO_3$), strontium titanate ($SrTiO_3$), lead lanthanum zirconium titanate ($PbLaZrTiO_3$) (PLZT), barium strontium titanate ($BaSrTiO_3$), tantalum oxide ($Ta_2O_5$), bismuth vanadium manganese oxide ($BiVMnO_3$) (BVMO), lead zirconium titanate ($PbZrTiO_3$) (PZT), strontium bismuth tantalate ($SrBi_2Ta_2O_9$) (SBT) and combinations thereof. In embodiments, the dielectric material comprises barium titanate ($BaTiO_3$), strontium titanate ($SrTiO_3$), lead lanthanum zirconium titanate ($PbLaZrTiO_3$) (PLZT), barium strontium titanate ($BaSrTiO_3$), tantalum oxide ($Ta_2O_5$), bismuth vanadium manganese oxide ($BiVMnO_3$) (BVMO), lead zirconium titanate ($PbZrTiO_3$) (PZT), strontium bismuth tantalate ($SrBi_2Ta_2O_9$) (SBT) and combinations thereof.

In embodiments, the dielectric constant of the dielectric material may be at least about 50, at least about 100, at least about 300, at least about 500, at least about 800, at least about 1000, and combinations thereof. In some embodiments, the dielectric constant of the dielectric particle may be at least about 50, at least about 100, at least about 300, at least about 500, at least about 800, at least about 1000, less than about 15000, less than about 10000, less than about 5000, less than about 3000, less than about 2500, less than about 2000, and combinations thereof.

In embodiments, the average particle size of the dielectric particles may be less than about 1000 nanometers, less than about 750 nanometers, less than about 500 nanometers, less than about 400 nanometers, less than about 250 nanometers, less than about 150 nanometers, less than about 100 nanometers, less than about 50 nanometers, less than about 20 nanometers, at least about 1 nanometer, at least about 2 nanometers, at least about 5 nanometers, at least about 10 nanometers, and combinations thereof.

In embodiments, the proportions of the materials of the electrolyte may be varied to achieve a desired level of ionic conductivity. In some embodiments, the electrolyte may comprise the ionically conductive polymer and a dielectric. In some embodiments, the electrolyte may comprise the ionically conductive ceramic and a dielectric material. In certain embodiments, the electrolyte may comprise the ionically conductive polymer, the ionically conductive ceramic and the dielectric. In certain embodiments, the ionically conductive polymer may be present in the amount of about 0 to about 99.9 weight percent, the ionically conductive ceramic may be present in the amount of about 99.9 to about 0 weight percent, and the dielectric material may be present in the amount of about 0.1 to about 10 weight percent based on the total weight of the electrolyte. In certain embodiments, the ionically conductive polymer may be present in the amount of about 15 to about 85 weight percent, the ionically conductive ceramic may be present in the amount of about 15 to about 85 percent, and the dielectric material may be present in the amount of about 0.1 to about 10 weight percent based on the total weight of the electrolyte. In some embodiments, the electrolyte may additionally include an electroactive material (e.g., a lithium reaction product). In certain embodiments, the electroactive material may be present in the amount of about 0 to about 85 weight percent based on the total weight of the electrolyte.

In embodiments, the electrolyte may additionally contain a lithium salt (e.g., lithium bis-trifluoromethanesulfonimide (LiTFSI), lithium hexafluorophosphate ($LiPF_6$), lithium perchorate ($LiClO_4$)). The lithium salt may be present in the proportion of about 0 to about 60 weight percent based on the total weight of the electrolyte.

In embodiments, the electrolyte may be formed by mixing the ionically conductive polymer, the ionically conductive ceramic, and the dielectric material. The components of the mixture may be uniformly or non-uniformly distributed. In some embodiments, the ionically conductive ceramic may be treated with the dielectric material prior to the addition of the ionically conductive polymer. In a further embodiment the ionically conductive ceramic may be pretreated with dielectric particles. In certain embodiments the pretreatment of the ionically conductive ceramics results in the dielectric particles being substantially on the surface of the ionically conductive ceramic.

In various embodiments the dielectric material does not completely coat the ionically conductive ceramic. Physical contact between the ionically conductive polymer and ionically conductive ceramic may provide a composite pathway through which metal ions may move. Without being bound to any theory, it is believed that the addition of a high-dielectric constant material adjacent to the polymer-ceramic interface reduces the formation of space charge regions at the interfaces facilitating ionic conductivity. The resulting composite electrolyte will have improved overall ionic conductivity, and a high transference number.

The invention further provides a cathode. An embodiment of a cathode 100 is shown in FIG. 1. In the example of FIG. 1 the cathode 100 comprises a current collector 110 (e.g., metal foil) having a first side and a second side, and a first cathode layer 120 comprising an active cathode material such as, but not limited to, sulfur or sulfur-containing materials (e.g., polyacrylonitrile-sulfur composites (PAN-S composites), lithium sulfide ($Li_2S$)); vanadium oxides (e.g., vanadium pentoxide ($V_2O_5$)); metal fluorides (e.g., fluorides of titanium, vanadium, iron, cobalt, bismuth, copper and combinations thereof); lithium-insertion materials (e.g., lithium nickel manganese cobalt oxide (NMC), lithium-rich NMC, lithium nickel manganese oxide ($LiNi_{0.5}Mn_{1.5}O_4$)); lithium transition metal oxides (e.g., lithium cobalt oxide ($LiCoO_2$), lithium manganese oxide ($LiMn_2O_4$), lithium nickel cobalt aluminum oxide (NCA), and combinations thereof); lithium phosphates (e.g., lithium iron phosphate ($LiFePO_4$)), a porous conductive material (e.g., carbon black, carbon fiber, graphite, graphene and combinations thereof) and an electrolyte (e.g., the electrolyte embodied above) deposited on the first side of the metal foil 110. The metal foil 110 may additionally be coated on the second side with a second cathode layer 130 comprising an active cathode material, a porous conductive material and an electrolyte. The thicknesses and compositions of the first cathode layer 120 and second cathode layer 130 may be same or different. In a further embodiment, the composition of the first cathode layer 120 and second cathode layer 130 are the same. In various embodiments, the electrolyte may comprise the electrolyte embodied above.

In embodiments, the proportions of the materials of the first cathode layer 120 and/or second cathode layer 130 can be varied to achieve the desired capacity of the cathode 100. In some embodiments, the materials of the first cathode layer 120 and/or the second cathode layer 130 may include the active cathode material in the amount of about 60 to about 85 weight percent, the conductive material in the amount of about 3 to about 10 weight percent, and the electrolyte in the amount of about 15 to about 35 weight percent based on the total weight of active cathode material, porous conductive material, and electrolyte.

In embodiments, the preparation of the cathode 100 comprises a slurry process in which the conductive material, the active cathode material, and the electrolyte are added to a solvent to form a slurry. The slurry can then be applied to the metal foil 110 followed by doctor blading to form the cathode 100.

Figure 2:
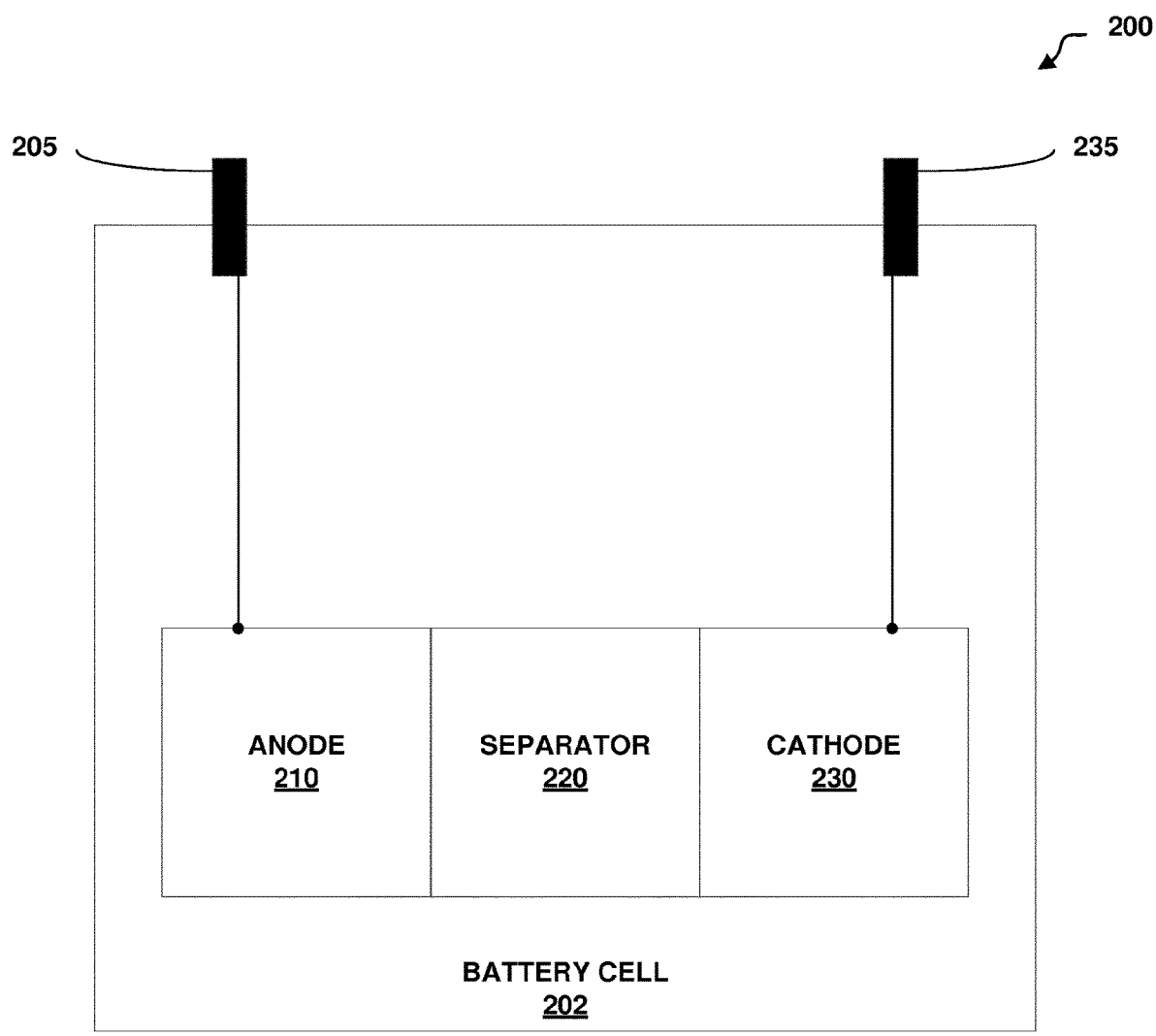
FIG. 2 is a schematic diagram illustrating a battery including a battery cell, in accordance with some embodiments.

The invention also provides a battery. An embodiment of a battery 200 is shown in FIG. 2. The battery 200 includes a battery cell 202, an anode current collector 205, an anode 210, a separator 220, a cathode 230, and a cathode current collector 235. In various examples, the anode current collector 205 comprises copper. In various examples, the anode 210 may include an oxidizable metal (e.g., lithium), a material capable of intercalating lithium (e.g., graphene, boron nitride), a solid electrolyte or solid polyelectrolyte (e.g., polyethylene oxide, silane polymer, siloxane polymer, ionically conductive ceramic and combinations thereof), a porous conductive additive (e.g., carbon black, graphite, graphene), ionically conductive ceramics (e.g., lithium phosphorous oxynitride (LiPON), lithium aluminum titanium phosphate (LATP), lithium aluminum germanium phosphate (LAGP)). In various examples, suitable materials for the separator 220 may include porous polymers (e.g., polystyrene-polyethylene oxide (PS-PEO)), ceramics (e.g., lithium phosphorous oxynitride (LiPON), lithium aluminum titanium phosphate (LATP), lithium aluminum germanium phosphate (LAGP)), and/or two dimensional sheet structures (e.g., graphene, boron nitride, dichalcogenides). In various examples the cathode 230 may comprise the cathode 100 of FIG. 1.

In embodiments, the cathode 230, separator 220, and/or anode 210 comprise an ionically conductive electrolyte that further contains a metal salt (e.g., lithium hexafluorophosphate (LiPF$_6$), lithium bis-trifluoromethanesulfonimide (LiTFSI), lithium perchorate (LiClO$_4$)) that provides the electrolyte with additional conductivity which reduces the internal electrical resistance of the battery cell.

It is believed that embodiments described herein and many of their attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An electrolyte comprising:
   a) an ionically conductive polymer;
   b) an ionically conductive ceramic; and
   c) a dielectric material having a dielectric constant of at least about 300,
   wherein the dielectric material comprises a dielectric nanoparticle, the dielectric nanoparticle having an average particle size of less than 100 nanometers;
   wherein the dielectric material is on the surface of the ionically conductive ceramic in the form of a particle; and
   wherein the ionically conductive ceramic having the dielectric material on the surface is distributed throughout the ionically conductive polymer.

2. The electrolyte of claim 1,
   wherein the ionically conductive polymer comprises a repeat unit selected from the group consisting of ethylene oxide derivatives, propylene oxide derivatives, ethylene imine derivatives, silane derivatives, siloxane derivatives, and combinations thereof.

3. The electrolyte of claim 1,
   wherein the ionically conductive ceramic comprises a material selected from the group consisting of lithium aluminum titanium silicon phosphate (LATSP), lithium lanthanum zirconate (LLZO), lanthanum lithium titanate (LLTO) and combinations thereof.

4. The electrolyte of claim 1,
   further comprising d) a lithium salt.

5. The electrolyte of claim 4,
   wherein the lithium salt comprises a lithium salt selected from the group consisting of lithium bis(trifluoromethane) sulfonimide (LiTFSI), lithium hexafluorophosphate (LiPF$_6$), lithium perchorate (LiClO$_4$), and combinations thereof.

6. The electrolyte of claim 1,
   wherein the dielectric material comprises a material selected from the group consisting of barium titanate (BaTiO$_3$), strontium titanate (SrTiO$_3$), lead lanthanum zirconium titanate (PbLaZrTiO$_3$) (PLZT), barium strontium titanate (BaSrTiO$_3$), tantalum oxide (Ta$_2$O$_5$), bismuth vanadium manganese oxide (BiVMnO$_3$) (BVMO), lead zirconium titanate (PbZrTiO$_3$) (PZT), strontium bismuth tantalate (SrBi$_2$Ta$_2$O$_9$) (SBT), and combinations thereof.

7. The electrolyte of claim 1,
   wherein the dielectric constant of the dielectric material is at least about 1000.

8. The electrolyte of claim 1,
   wherein the dielectric material is present in an amount of about 0.1 to about 10 weight percent based on a total weight of the electrolyte.

9. A cathode comprising:
   a) an active cathode material;
   b) a porous conductive material; and
   c) the electrolyte of claim 1.

10. A battery comprising:
    a) an anode;
    b) a separator; and
    c) the cathode of claim 9.

\* \* \* \* \*